May 25, 1926.
F. H. SHAW
1,586,122
PROCESS OF MAKING BASES AND RECEPTACLES FOR VACUUM TUBES
Original Filed August 20, 1919    2 Sheets-Sheet 1
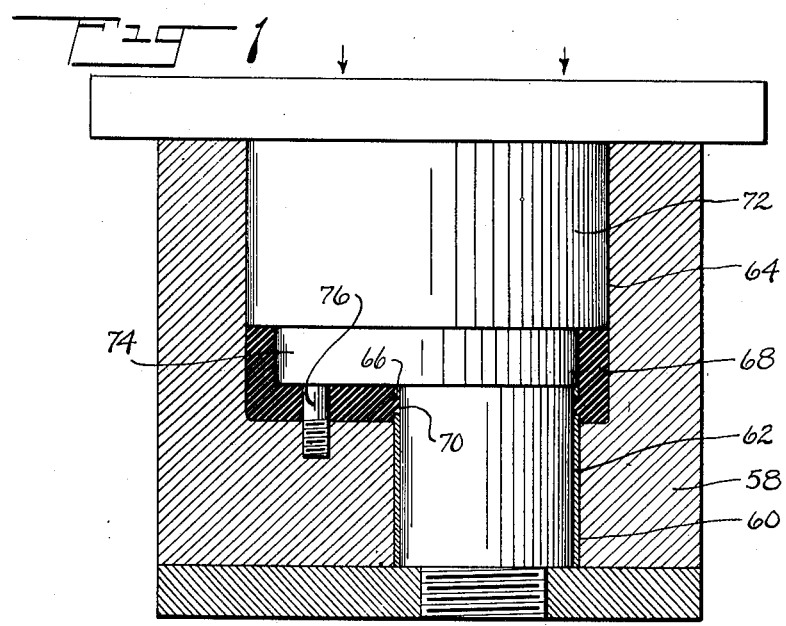
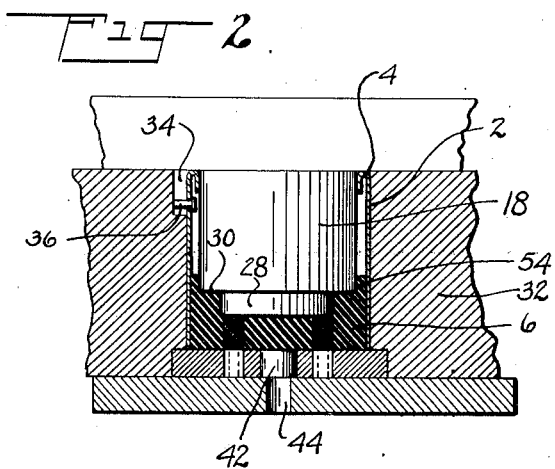
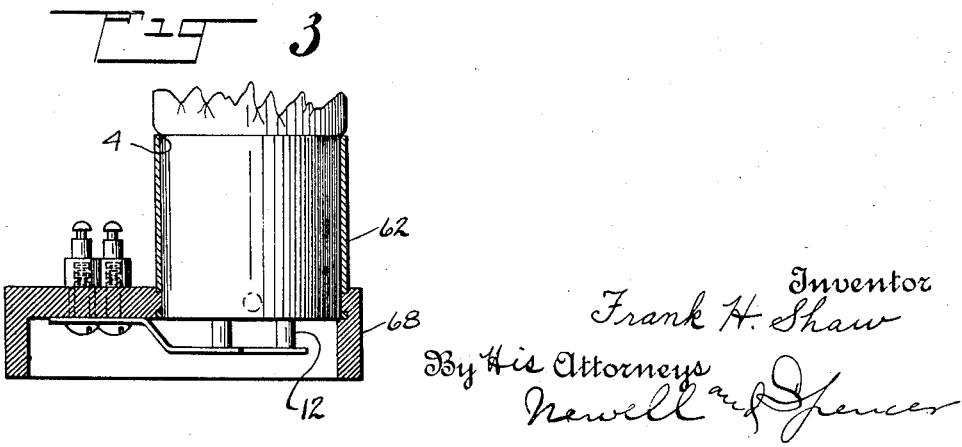
Inventor
Frank H. Shaw
By His Attorneys
Newell and Spencer May 25, 1926.
F. H. SHAW
1,586,122
PROCESS OF MAKING BASES AND RECEPTACLES FOR VACUUM TUBES
Original Filed August 20, 1919    2 Sheets-Sheet 2
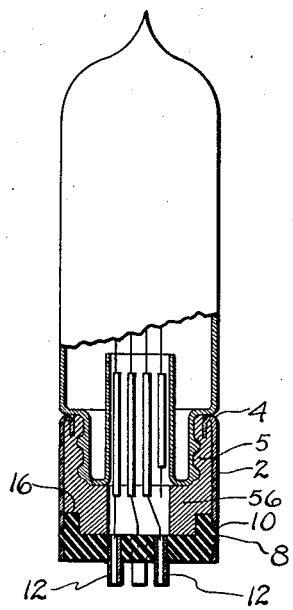
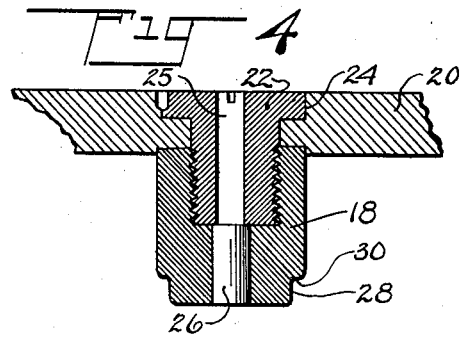
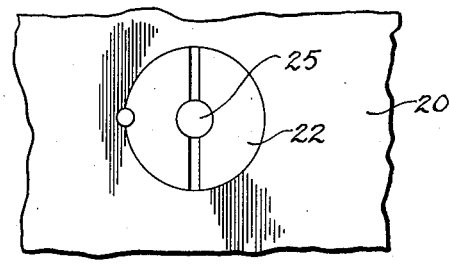
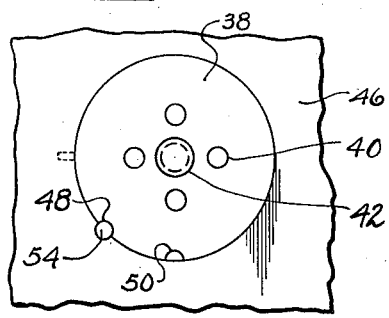
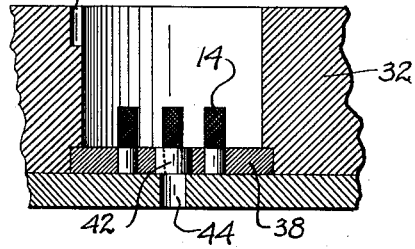
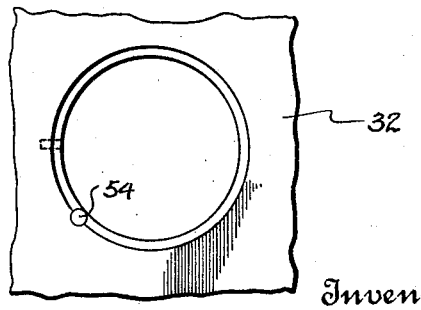
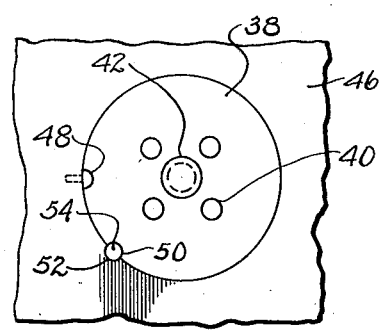
Inventor
Frank H. Shaw
By His Attorneys Patented May 25, 1926.

1,586,122

UNITED STATES PATENT OFFICE.

FRANK H. SHAW, OF EAST ORANGE, NEW JERSEY.

PROCESS OF MAKING BASES AND RECEPTACLES FOR VACUUM TUBES.

Original application filed August 20, 1919, Serial No. 318,838. Divided and this application filed July 18, 1922. Serial No. 575,892. Renewed August 17, 1925.

This invention relates to a process of making bases or receptacles particularly adapted for use with electrical apparatus, and a general object of the invention is to facilitate the manufacture of bases or receptacles which will better meet the varied conditions of use to which such structures are now frequently subjected, particularly when utilized in connection with radio telegraph or telephone apparatus, or with the electric or radio equipment of airplanes, with the consequent subjection to marked changes in temperature and in atmospheric conditions.

An important feature of the invention is the novel process of molding the insulating part of the base or receptacle into tight-fitting air and moisture proof relation to the other elements of the base or receptacle.

Other objects and important features of the invention will appear from the following description and claims when considered in connection with the accompanying drawings, in which—

Figure 1 is a sectional view through the female mold member of a mold for producing the receptacle shown in Fig. 3;

Fig. 2 is a sectional view through the molds, in molding relation, designed to produce the base shown in Fig. 10;

Fig. 3 is a sectional view through a receptacle adapted to receive the base shown in Fig. 10;

Fig. 4 is a section through the male mold member of the mold shown in Fig. 2;

Fig. 5 is a plan view of the upper end of the male mold showing the mode of mounting it in its support;

Fig. 6 is a sectional view through the female mold member adapted to cooperate with the male mold member shown in Fig. 4;

Fig. 7 is a bottom plan view of the female mold member having the parts adjusted to produce the base shown in Fig. 10;

Fig. 8 is a similar bottom plan view having the parts adjusted to produce a base having three insulated terminals and one grounded terminal which can be used with the same receptacle as the base shown in Fig. 10.

Fig. 9 is a bottom plan view of the female mold with the base plate removed, and Fig. 10 shows the manner in which a base of the type adapted to be made by the process of the present invention is connected to the vacuum tube of a radio detector.

The base which constitutes the subject matter of the present invention is particularly adapted for use with vacuum tubes such as are employed in incandescent lamps, and is herein shown in Fig. 10 as employed with a detector tube constituting a part of a radio telegraph or telephone equipment particularly of the type commonly employed with airplanes.

These incandescent lamp detectors commonly have three or four terminals, according to the type of detector employed, and therefore two types of bases are provided, for which the molds herein shown may readily be adapted.

As shown in Figs. 2 and 10, the base comprises essentially a metallic shell 2 having an inturned hook-like flange 4 adapted to constitute anchorage for the cement 5 by which the vacuum tube is locked to the base. One end of the shell is closed by a closure of insulating material, preferably material which will stand relatively great variations of temperature and atmospheric conditions, for example, bakelite, condensite or other phenolic condensation product, and this closure is preferably molded into position under heavy pressure, so that it will absolutely and tightly fill the open end of the shell and have an air and moisture proof fit in said shell end.

The illustrated closure 6, which is preferably of some phenolic condensation product, is locked in position in the shell by means of radial lugs or projections 8, see Fig. 10, which are formed in the molding operation by directing a component of the molding pressure laterally so that some of the insulating composition is forced out through the openings 10 in the shell 2. The base also comprises terminals 12 for the filament and for the conductors of the detector, which terminals are also brought into air and moisture proof relation to the closure 6 by the molding operation and are locked in position in said closure. To insure effective locking of the terminals 12 in the closure 6, the terminals are preferably provided with a burred surface 14 upon that part of each which is locked in the closure 6.

The novel process of forming the base closure will now be described. From an inspection of Figs. 2 and 10, it will be noted that there is preferably formed on the closure 6 a shoulder 16, and that that part of this closure 6 in which the terminals 12 are locked is preferably of such thickness that the inner ends of these terminals are substantially flush with the inner surface of the part of the closure in which they are locked. The shoulder 16 is not only an important structural feature of the base, but the provision of this shoulder contributes to the successful molding of the insulation into air and moisture proof fit in the shell end and also to the forming of the lugs or radial projections 8 for the interlocking of the closure with the shell.

In Fig. 4 of the drawings, the male molding die 18, which is employed in forming the base shown in Figs. 2 and 10, is illustrated, this die being locked to a die carrier 20 by means of a screw 22 threaded into the upper end of said die and having a head received in a countersunk recess 24 in the carrier 20. The screw 22 is preferably provided with a central bore 25 through which any suitable tool may be passed into engagement with the central plug 26 of the die 18 to impart a disengaging shock to the molded material in case it adheres to the die 18. It will be noted from Fig. 2 that the main body of the die 18 is of substantially the diameter of the opening bounded by the inturned flange 4 of the shell 2, it being obviously impossible to use a solid die having a diameter substantially greater than the said opening. In order to compact the material to be molded against the inner wall of the shell 2 in air and moisture proof fit against said wall and at the same time to compact it so that it will have the required solidity and permanence of structure, and also to prevent too much flow of the material up the sides of the shell into the space between the sides of the die and the inner wall of the shell, the male die is provided with a reduced end part 28 and with a shoulder 30, the shoulder being preferably slightly rounded both where it joins the main part 18 and where it joins the reduced part 28 of the die.

The female die 32 is adapted to closely embrace the shell into which the closure is to be molded, this die being provided with a vertical groove 34 to receive the pin 36 on the shell 2, this pin constituting a part of the bayonet lock by which the base is locked in the receptacle. The female die 32 is preferably provided with a removable and adjustable bottom plate 38 having openings 40 therein to receive the terminals 12 and hold them in position to be molded into the closure 6, this bottom also having a central plug 42 located over an opening 44 on the female die carrier 46 whereby a releasing shock may be imparted to the molded material after the molding operation.

In order to provide for molding either a base having a three point contact or a base having a four point contact in the same mold, the bottom plate 38 of the female die is angularly adjustable, being provided with two half cylindrical sockets 48 and 50 each adapted to form, with a half cylindrical socket 52 in the main part 32 of the die, a pin-receiving socket adapted to receive a locking pin 54 for holding the bottom plate 38 in proper adjusted position. When the parts are in the position shown in Fig. 7, the bottom plate is adapted to hold the terminals in proper relation to the pin 36 of the bayonet joint for a four terminal socket. In Fig. 8 the bottom plate is shown in position with respect to the pin 36 on the shell 2 so that it positions the terminals for a three terminal socket. In order to form a three terminal socket, four terminals are preferably molded into position in the closure 6, but one of the terminals is grounded upon the shell of the socket in a manner more fully set forth in my co-pending application hereinafter identified.

In the molding operation, it will be noted that the action of the shoulder 30 of the male die 18, as shown in Fig. 2 of the drawings, is to cause a component of the molding pressure to be exerted laterally with respect to the direction of relative movement of the molds, thus forming the material into tight-fitting contact with the inner wall of the shell 2. This action also insures forcing of the material through the openings 10 in the shell to form the radial interlocking lugs or projections 8 upon the closure. Preferably the openings 10 in the shell 2 are so located as slightly to overlap that part of the closure which lies between the reduced extension 28 of the male die and the inner wall of the shell 2. Preferably a slight surplus of material will be put into the female mold in order to insure packing of the material to the required solidity and permanence of structure, the excess flowing slightly up the sides above the shoulder 30 as shown at 54 in Fig. 2. This excess is preferably not enough to flow up to the inturned flange 4, since this would obviously interfere with the interlocking action of this flange with the cement 5 by which the vacuum tube is locked in position in the base.

In Fig. 1 of the drawings is shown the mold for forming a receptacle such as shown in Fig. 3 having its insulating part interlocked with the shell in the manner of the interlocking of the closure part of the base in the base construction. In Fig. 1 the female die 58 is shown as having a lower cylindrical cavity or recess 60 adapted to embrace the shell 62 of the receptacle, this shell preferably having formed therein the other part of the bayonet joint of which the pin 36 hereinabove referred to constitutes one part. Above the cylindrical recess 60 of the female die 58 is a larger cylindrical recess 64 eccentric to the recess 60 and into which the upper end of the shell 62 projects a short distance. The shell 62 is preferably provided with openings 66 corresponding in function to the openings 10 in the base shell 2, and in the molding operation the insulating material, which forms the insulating base or terminal support 68 of the receptacle, is forced inward into these openings 66, thus forming radial interlocking lugs or projections 70 similar to the lugs or projections 8 by which the closure 6 is locked in the base shell 2. The male die 72 has a reduced lower end to form a flange on the insulating base 68, and the female die preferably carries one or more lugs 76 extending to the lower limit of movement of the male die 72 to provide binding post openings in the insulating base 68 of the receptacle.

By forcing the insulating material, which, as above suggested, is preferably a phenolic condensation product under pressure into close-fitting relation to a smooth cylindrical shell surface and by interlocking the shell and the insulation by causing projections to be forced by the molding pressure into spaced radially arranged openings in the shell, a base or receptacle construction has been provided which has been found to be particularly effective for meeting the extremes of temperature and of atmospheric conditions to which such apparatus is now frequently subjected, particularly when utilized in connection with radio telegraph equipment for airplanes.

This application is a division of my co-pending application, Serial Number 318,838, filed August 20, 1919, for Letters Patent for improvements in vacuum tube bases and receptacles, which has matured into Letters Patent No. 1,458,153, granted June 12, 1923, the novel base or receptacle produced by the process being claimed in said co-pending application.

What I claim as new is:

1. The process of molding an insulating closure into air and moisture proof fit in one end of a shell having a reduced opening at its other end, which consists in partly confining, during the molding operation, a marginal portion of said material between the shell wall and vertical and horizontal pressure surfaces upon a non-expansible male die, whereby both a vertical and a lateral compacting pressure are exerted upon the said marginal material.

2. The process of forming a base on one end of a shell which consists in molding, under pressure, to one end of the shell, a body of plastic material, and locking said body in place by so directing a component of the pressure as to force portions of said material substantially radially outward into air and moisture tight fit against said shell wall and into interlocking relation to openings in the shell wall.

3. The process of securing a moldable body to a metal perforated shell which consists in molding, under pressure, to a shell, a body of a plastic product, and locking said body in place by so directing a component of the pressure as to force portions of said material substantially radially into air and moisture tight fit against said shell wall and into interlocking relation to perforations in the shell wall.

4. The process of uniting a cylindrical metallic shell and insulating material exemplified by a phenolic condensation product and at the same time molding said material into the desired form of the insulating part of the structure, which consists in partly confining during the molding operation a portion of said material between the shell wall and vertical and horizontal pressure surfaces upon non-expansible molding dies, in order to force portions of said material substantially radially into air and moisture-tight fit against said shell wall and also into interlocking relation to openings in the shell wall, while positively supporting the opposite side of the shell wall.

5. The method of molding a body of plastic insulating material to the open end of a tubular foraminous metallic shell which comprises applying the material to one side of the shell adjacent said open end and forcing an increment of said material into interlocked engagement extending into an aperture in said shell by means of pressure exerted on the material.

6. The method of making electrically insulated structures, which comprises applying a body of a plastic insulating compound capable of withstanding great variations of temperature and atmospheric conditions to one side of a foraminous metal shell, compacting said body and forcing a portion thereof through the apertures in the shell to lock the plastic body to the shell by pressure applied to the body.

Signed at Newark, N. J., this 13 day of July 1922.

FRANK H. SHAW.